(12) United States Patent
Hayasaki et al.

(10) Patent No.: US 8,774,669 B2
(45) Date of Patent: Jul. 8, 2014

(54) SWITCHING POWER SOURCE AND IMAGE FORMING APPARATUS INCLUDING THE SAME

(75) Inventors: Minoru Hayasaki, Mishima (JP); Kenichi Karino, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 13/164,493

(22) Filed: Jun. 20, 2011

(65) Prior Publication Data

US 2011/0311259 A1 Dec. 22, 2011

(30) Foreign Application Priority Data

Jun. 22, 2010 (JP) .................................. 2010-141938

(51) Int. Cl.
*G03G 15/00* (2006.01)

(52) U.S. Cl.
USPC .......................................................... 399/88

(58) Field of Classification Search
USPC .............................................. 399/88; 363/89
See application file for complete search history.

(56) References Cited

U.S. PATENT DOCUMENTS

| | | | |
|---|---|---|---|
| 7,123,491 B1 * | 10/2006 | Kusumi ........................... | 363/46 |
| 2003/0214820 A1 | 11/2003 | Nakata | |
| 2007/0164720 A1 * | 7/2007 | Lalithambika et al. ........ | 323/288 |
| 2008/0186742 A1 * | 8/2008 | Seong .............................. | 363/17 |
| 2009/0231894 A1 * | 9/2009 | Moon et al. ..................... | 363/89 |
| 2010/0149840 A1 | 6/2010 | Hayasaki | |
| 2011/0064445 A1 * | 3/2011 | Yashiro ........................... | 399/88 |

FOREIGN PATENT DOCUMENTS

| | | |
|---|---|---|
| CN | 101552560 A | 10/2009 |
| JP | 07-163143 A | 6/1995 |
| JP | 07-245942 A | 9/1995 |
| JP | 11-215819 A | 8/1999 |
| JP | 2003-299356 A | 10/2003 |
| JP | 2004-080941 A | 3/2004 |
| JP | 3567355 B2 | 9/2004 |
| JP | 3665984 B2 | 6/2005 |

OTHER PUBLICATIONS

Kim, Hyeong-Woo, "Analysis on Technical Development Trends and Market Trends for Standby Power Saving Function Embedded Power IC for Power Device," Senior researcher in the Energy Semiconductor Research Center of the Korean Electrotechnology Research Institute, pp. 1-13.

* cited by examiner

*Primary Examiner* — Walter L Lindsay, Jr.
*Assistant Examiner* — Frederick Wenderoth
(74) *Attorney, Agent, or Firm* — Canon USA, Inc. IP Division

(57) ABSTRACT

In a switching power source, an OFF-period of switching is set according to a resonance cycle when a transformer is driven.

16 Claims, 18 Drawing Sheets

SWITCHING POWER SOURCE AND IMAGE FORMING APPARATUS INCLUDING THE SAME

BACKGROUND OF THE INVENTION

1. Field of the Invention

The present invention relates to a switching power source for generating a direct-current voltage.

2. Description of the Related Art

With an increase in demand for various power-saving electronic devices in recent years, more power saving is requested of power sources for the electronic devices. As an example of the power source for the electronic device, there is used a power source based on a switching system (hereinafter, switching power source) that outputs a target voltage by driving a switching element such as a field effect transistor (FET) with a predetermined drive frequency.

Such switching power sources include a power source that improves efficiency by reducing the number of switching operations of the switching element during a power saving operation (during light load running). There have also been yearly changes in power saving standard, and improvement of efficiency is requested by saving power during the light load running other than during normal running.

Most losses of the switching power source during the light load running are caused by a switching operation. Efforts have therefore been made to reduce the losses caused by the switching operation. For example, energy of one switching operation is increased by prolonging an ON-period of the switching element, and the number of switching times per unit time is reduced by prolonging a pause period.

However, the longer pause period reduces a switching frequency. The sound generated due to the lower switching frequency enters an audible range, possibly reaching human ears. The sound generated due to the lower switching frequency becomes a sound including a harmonic, which is disagreeable to the ear.

The reason why the lower switching frequency generates the sound including the harmonic is described below. When the switching frequency drops to several kilohertz or less, the pause period of the switching element becomes longer. Thus, a drive current waveform of a transformer becomes a delta-function waveform illustrated in FIG. 10.

Frequency analysis of such a drive current waveform of the transformer reveals that the waveform has a frequency component containing a harmonic of 100 kilohertz or more with the switching frequency set as a fundamental wave. FIG. 11 illustrates frequency characteristics of the drive current waveform illustrated in FIG. 10. As illustrated in FIG. 11, the waveform becomes a current waveform having energy driven with a multiple higher frequency (harmonic) of the switching frequency.

The transformer of the switching power source also performs a switching operation to be driven with a predetermined resonance frequency. The resonance frequency generated by mechanical vibrations of the transformer has, though dependent on a core shape of the transformer, a peak approximately at several kilohertz to several tens of kilohertz.

FIG. 12 illustrates a resonance frequency generated by mechanical vibrations of the transformer. FIG. 5B illustrates a result of measuring, by using a microphone, a sound generated when the transformer having characteristics illustrated in FIG. 12 is driven based on the drive current waveform illustrated in FIG. 11 and analyzing frequency characteristics.

As illustrated in FIG. 5B, a beat sound generated from the transformer characteristically contains a harmonic where the envelope exhibits resonance characteristics of the transformer with an intermittent switching frequency set as a basic wave. FIG. 5A illustrates a waveform of a drive signal input to the transformer.

As illustrated in FIG. 5B, when the switching frequency and the mechanical resonance frequency of the transformer overlap each other to lower the switching frequency, a sound that enters the audible range as a beat sound from the transformer is generated.

As one of methods for reducing such a beat sound from the transformer, a method for reducing the beat sound by suppressing a magnetic field change rate of the transformer is well-known. Conventionally, to suppress the magnetic field change rate of the transformer, there has been employed a method for using a core material having a large sectional area for the transformer or reducing a current per one transformer operation by shortening the ON-period of the switching element.

As a method for reducing the beat sound of the transformer by ingeniously setting the drive current waveform of the transformer, there is a method for gradually changing a duty ratio during voltage rising or falling at both ends of a capacitor at the time of activation by installing a soft start circuit in a switching power source apparatus. Gradually increasing or decreasing the amplitude of the drive current waveform of the transformer enables reduction of a magnetic flux change of the transformer, and hence generation of beat sounds can be reduced. Such a conventional method is discussed in, for example, Japanese Patent No. 3567355 or Japanese Patent No. 3665984.

However, the use of the core material large in sectional area for the transformer causes an increase in size of the transformer, resulting in a difficulty of downsizing the switching power source or the apparatus that includes the switching power source. The method for shortening the ON-period of the switching element can reduce the beat sound of the transformer because the shorter ON-period reduces the magnetic field change. However, the number of switching times per unit time increases, and hence switching losses increase.

In the case of the method for gradually increasing or decreasing the size of the drive current waveform of the transformer, when power consumption is reduced more, application of the method is difficult if energy supplied to a load of a secondary side is small. It is because during the light load running, it is difficult to gradually increase or decrease the amplitude of the current waveform by the soft start circuit.

In the conventional method, switching must be performed more times by reducing energy supplied for one switching operation, or the capacity of a capacitor of the secondary side must be increased several times without changing the energy supplied for one switching operation. The former method increases switching losses, greatly lowering efficiency. The latter method increases costs.

In other words, in the switching power source, reduction of switching losses by decreasing the number of switching times, is required. However, this case has a contradiction, namely, a larger sound generated from the transformer because energy per wave applied to the transformer is increased.

SUMMARY OF THE INVENTION

The present invention is directed to a switching power source that can reduce a beat sound generated from a transformer during light load running without increasing a size of the transformer or switching losses.

According to an aspect of the present invention, a switching power source includes a transformer, a switching unit configured to switch a voltage supplied to a primary side of the transformer, an output unit configured to output a voltage generated on a secondary side of the transformer, and an OFF-period setting unit configured to set an OFF-period of the switching unit so that during light load running where the voltage generated on the secondary side of the transformer is low, a harmonic to generate by overlapping a drive frequency by the switching unit and a frequency of a sound generated by vibrations of the transformer is attenuated.

According to another aspect of the present invention, an image forming apparatus includes an image forming unit configured to form an image, a control unit configured to control an operation of the image forming unit, and a switching power source configured to supply power to the control unit, wherein the switching power source includes, a transformer, a switching unit configured to switch a voltage supplied to a primary side of the transformer, an output unit configured to output a voltage generated on a secondary side of the transformer, and an OFF-period setting unit configured to set an OFF-period of the switching unit so that in a light load state where the voltage generated on the secondary side of the transformer is low, a harmonic to generate by overlapping a drive frequency by the switching unit and a frequency of a sound generated by vibrations of the transformer is attenuated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Exemplary embodiments described below are only examples, and in no way limit a technical scope of the present invention.

Figure 1A:
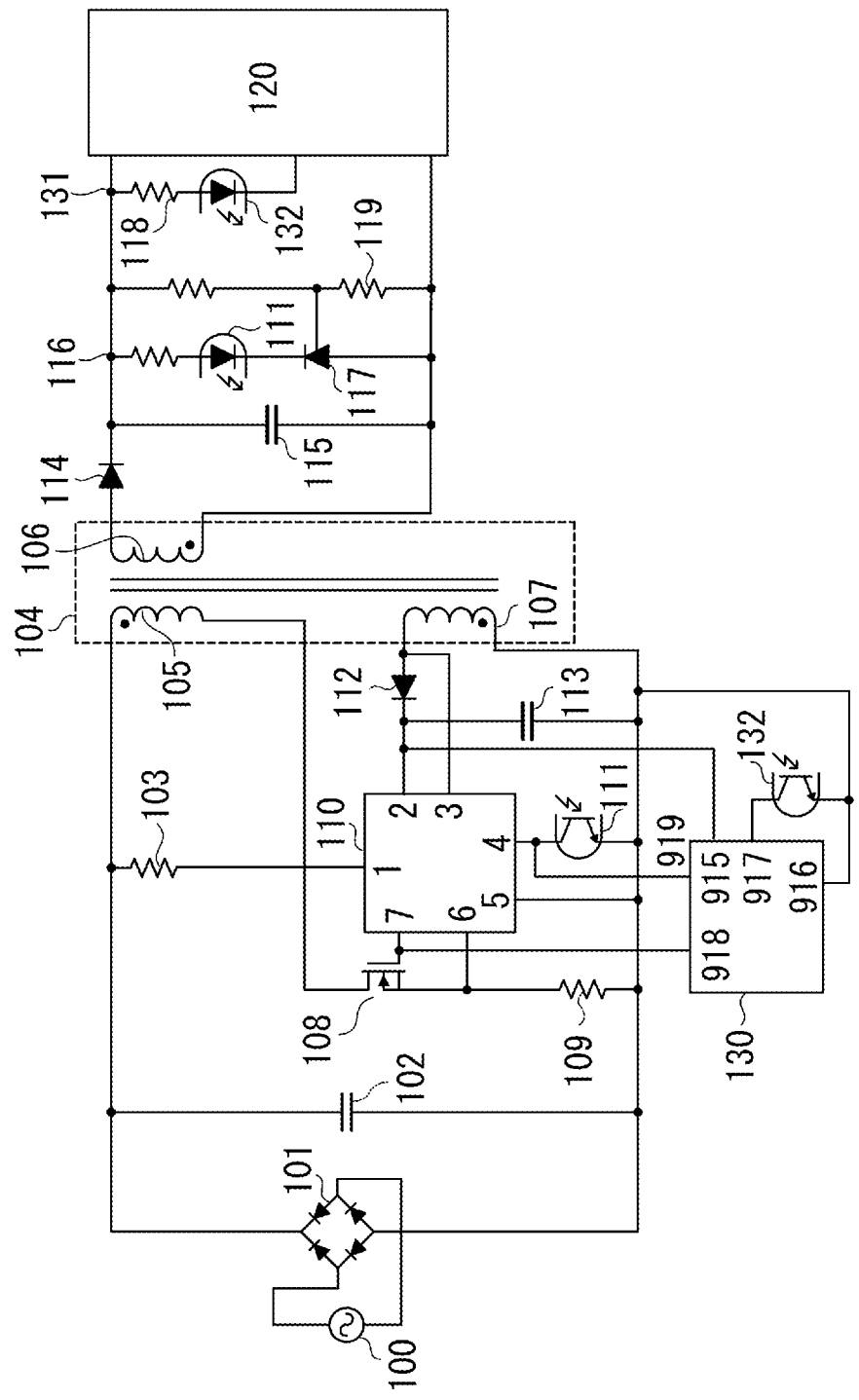
FIGS. 1A to 1C are circuit diagrams illustrating a switching power source based on a pseudo-resonance system, and an internal circuit diagram illustrating an integrated circuit (IC).

FIG. 1A is a circuit diagram illustrating a power source based on a switching system (hereinafter, also referred to as a switching power source). The circuit according to the present exemplary embodiment is a switching power source based on a pseudo-resonance system. In FIG. 1A, the switching power source includes an alternate-current (AC) line input 100, a diode bridge 101, a primary electrolytic capacitor 102, an starting resistor 103, a transformer 104, a primary winding wire 105 of the transformer, a secondary winding wire 106 of the transformer, and an auxiliary winding wire 107 of the transformer.

The switching power source also includes a main switching element 108 (metal-oxide semiconductor field-effect transistor (MOSFET) is used in the present exemplary embodiment) located on a primary side to switch ON/OFF power supplying to the transformer, a current detection resistor 109, a switching control IC 110, a phototransistor 111 of a photocoupler, a diode 112, and a capacitor 113.

The switching power source further includes a diode 114 connected to a secondary side of the transformer, a capacitor 115, a resistor 116, a light-emitting diode (LED) side 111 of the photo coupler, a shunt regulator 117, resistors 118 and 119, and a load circuit 120. As an example of the switching control IC 110, a generally used pseudo-resonance IC is described below.

In the present exemplary embodiment, a transformer of an EER type is used as the transformer. This transformer is manufactured through a process of dipping the transformer in a liquid in which a resin of wax or varnish has been dissolved, and then drying the transformer.

Figure 12:
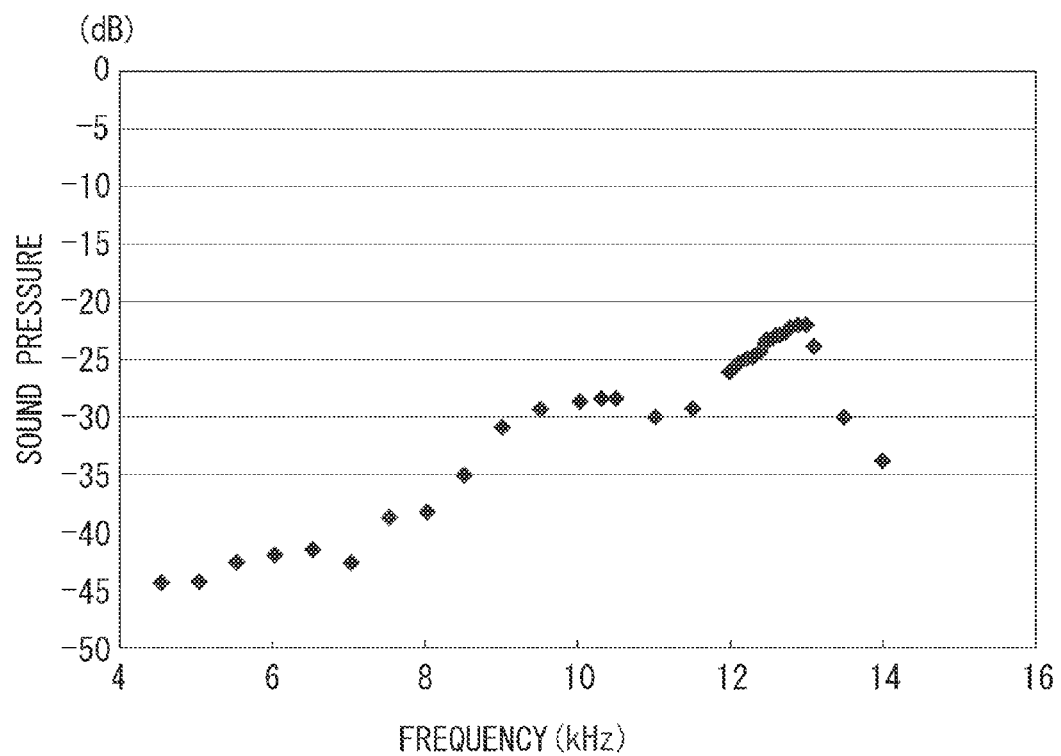
FIG. 12 illustrates resonance frequency characteristics of the transformer according to the first exemplary embodiment.

A beat sound of the impregnated transformer is smaller than that of an unimpregnated transformer, and a coil bobbin and a core can stably be fixed. In many cases, the impregnation is performed in a state where the coil is wound on the coil bobbin and the core is assembled to be fixed by a core tape. Characteristics of the resonance frequency of the transformer of the EER type are similar to those described above referring to FIG. 12.

Figure 1B:
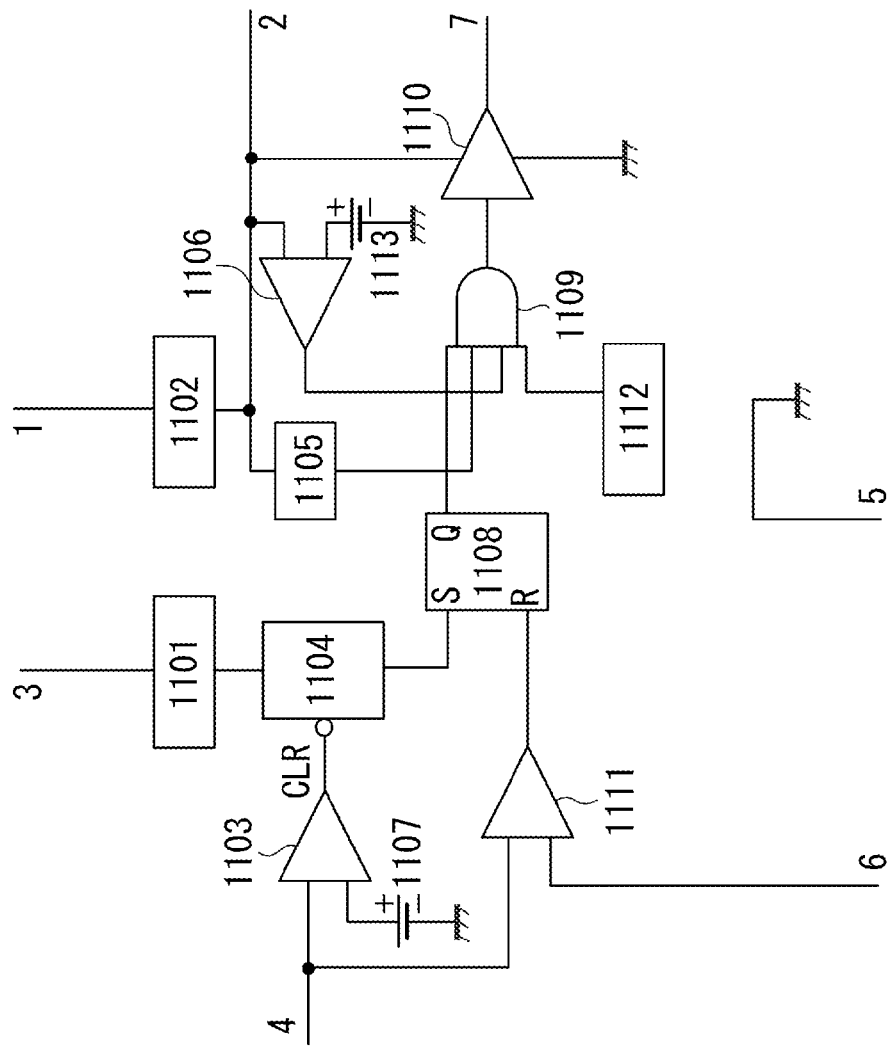

The switching control IC 110 illustrated in FIG. 1A is a general pseudo-resonance IC. FIG. 1B is a simple block diagram illustrating the switching control IC 110. In FIG. 1B, the switching control IC 110 includes a terminal 1 that is an activation terminal, and a power source circuit 1102. The power source circuit 1102 includes a high-voltage switch, and operates, when a voltage from the power source terminal of a terminal 2 is low, by turning ON the high-voltage switch to acquire power via the starting resistor 103 installed outside the switching control IC 110.

When the switching element 108 illustrated in FIG. 1A is turned ON/OFF, a voltage is supplied from the auxiliary winding wire 107 of the transformer 104, and the voltage of the terminal 2 rises to stabilize. Then, the switching control IC 110 can operate only by power supplied from the terminal 2 while the voltage supplied from the terminal 1 is cut off.

A terminal 3 detects a lower limit (voltage reduction) of a flyback voltage, and a circuit 1101 detects a lower limit (voltage reduction) of the voltage. A reduction in flyback voltage is detected, and then a signal is output to a one-shot circuit 1104.

A flip-flop 1108 is set to perform outputting based on detection of the lower limit of the flyback voltage of the one-shot circuit 1104, and operates to stop the outputting based on the output from a comparator 1111. Thus, the switching control IC 110 outputs a signal at timing when the flyback voltage input to the terminal 3 reaches its lower limit, and turns ON the switching element 108.

A terminal 4 is a feedback terminal connected to a comparator 1103 and the comparator 1111 in the switching control IC 110. The comparator 1103 is connected to a reference voltage 1107, and clears the one-shot circuit 1104 when the voltage of the terminal 4 drops below the reference voltage 1107. Thus, while the voltage of the terminal 4 is lower than the reference voltage 1107, the switching control IC 110 is inhibited from turning ON the gate of the switching element 108, and the reference voltage 1107 becomes the pulse stop voltage.

A terminal 5 is a ground (GND) terminal, and a terminal 6 is a current detection terminal. The terminal 6 is connected to the comparator 1111. When the voltage is larger than the feedback voltage of the terminal 4, the comparator 1111 operates to set an R terminal of the flip-flop 108 to Hi. Thus, the terminal 6 operates to turn OFF the switching element 108 when the current becomes larger to increase the voltage of the detection resistor 109.

A comparator 1106, which monitors a power source voltage, is a protection circuit for inhibiting the switching control IC 110 from outputting the gate voltage when the voltage of the terminal 2 is low. A circuit 1105, which generates a reference voltage in the switching control IC 110, is connected to an AND circuit 1109 to enable an output from a terminal 7 when the reference voltage is determined. A stop circuit 1112 is configured to stop the output from the terminal 7 when an abnormal internal temperature or an abnormal current waveform is generated in the switching control IC 110.

When power is supplied, the switching control IC 110 connects the internal circuit of the terminal 1 to the starting resistor 103 to receive a voltage supplied via the starting resistor 103. The switching control IC 110 outputs the voltage to the terminal 7 to turn ON the switching element 108. In this case, a voltage is not yet generated at the secondary side capacitor 115 of the transformer, or only a low voltage remains. Hence, the LED of the photocoupler 111 emits no light, and the phototransistor of the photocoupler 111 is not turned ON.

The voltage of the terminal 4 is accordingly maintained high, and the switching control IC 110 continues the output from the terminal 7 until a drain current of the switching element 108 becomes large, and maintains ON of the switching element 108. The switching control IC 110 compares the voltages of the terminal 4 and the terminal 6 with each other, namely, voltages generated in the current detection resistor 109, and turns OFF the switching element 108 when the voltage of the terminal 6 becomes higher than that of the terminal 4.

After the switching element 108 has been turned OFF, a voltage is generated in the secondary winding wire 106 of the transformer in a direction for charging the capacitor 115 through the diode 114, and the capacitor 115 of the secondary side is thus charged. This current declines with energy discharging from the transformer. After all the energy of the transformer has been discharged, the voltage of the secondary winding wire 106 becomes smaller than that of the capacitor 115 of the secondary side, thus setting the diode 114 to be nonconductive.

Then, the voltage at a drain terminal of the switching element 108 of the primary side is also reduced, and the voltage of the drain terminal starts free vibration around the voltage of the primary electrolytic capacitor 102. A voltage waveform similar to the voltage that freely vibrates appears on the auxiliary winding wire 107, accordingly reducing the voltage of the terminal 3 of the switching control IC 110 connected to the auxiliary winding wire 107.

The terminal 3 has a function of detecting a lower limit of the voltage, and the voltage is output from the terminal 7 of the switching control IC 110 to turn ON the switching element 108. Thus, the switching element 108 is repeatedly turned ON and OFF to continuously output a drive pulse (hereinafter, pulse) of a predetermined drive frequency, thereby driving the primary winding wire of the transformer.

When the capacitor 113 is charged by the voltage of the auxiliary winding wire 107, and increases as a power source for the switching control IC 110 to a sufficient voltage, the switching control IC 110 stops power supplying from the terminal 1, and operates only by power of the terminal 2. When the output voltage generated on the secondary side of the transformer and rectified and smoothed rises to approach a predetermined voltage, the shunt regulator 117 operates to start supplying a current to the photocoupler 111.

Then, the voltage of the terminal 4 drops, reducing a maximum current value during the ON-period of the switching control element 108. An ON-width (ON-period) of the switching element 108 is accordingly shortened to reduce energy stored for one operation of the transformer. As a result, an increase in the output voltage is controlled to be suppressed to output a predetermined target voltage.

Figure 1C:
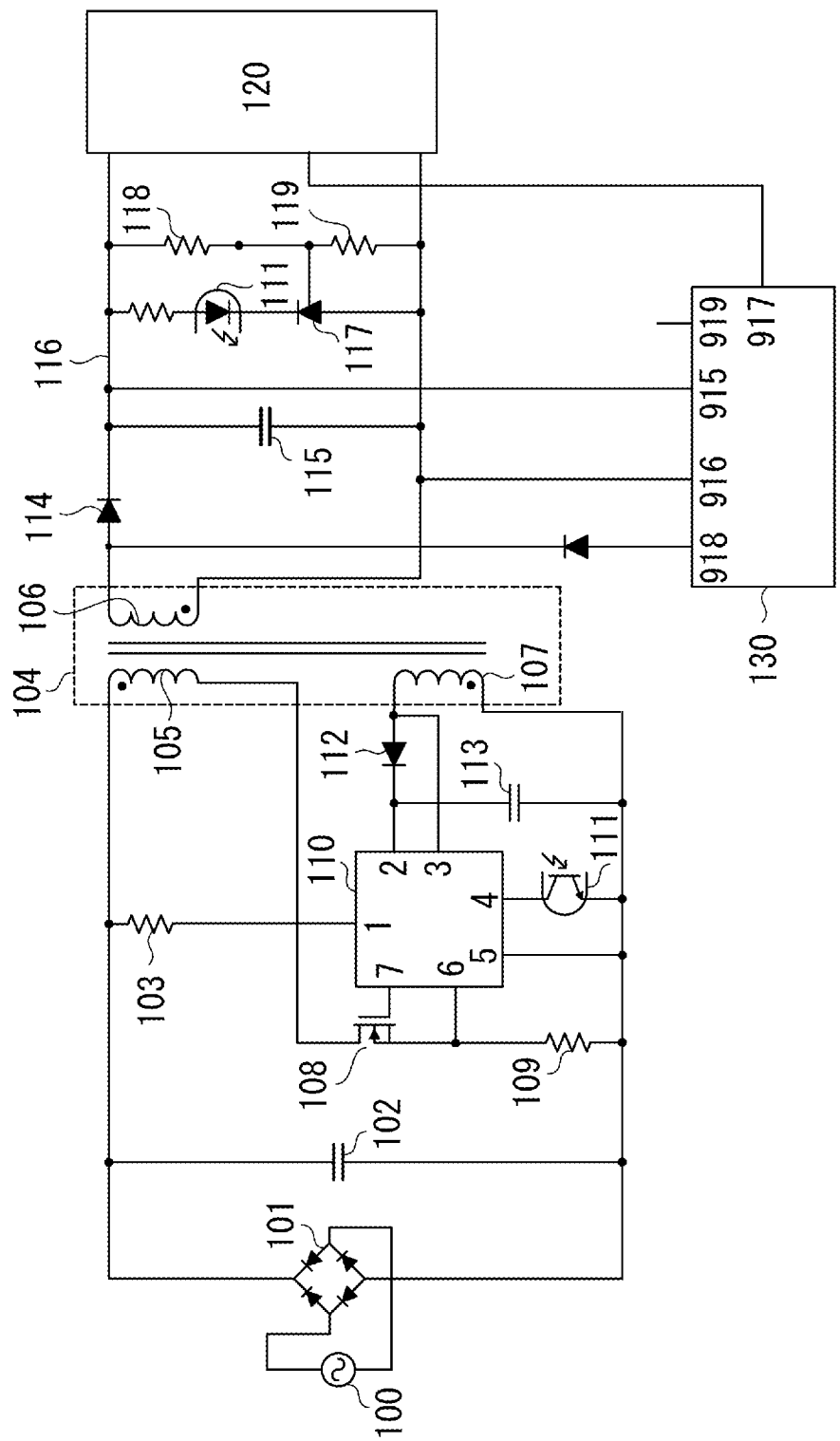
Figure 2:
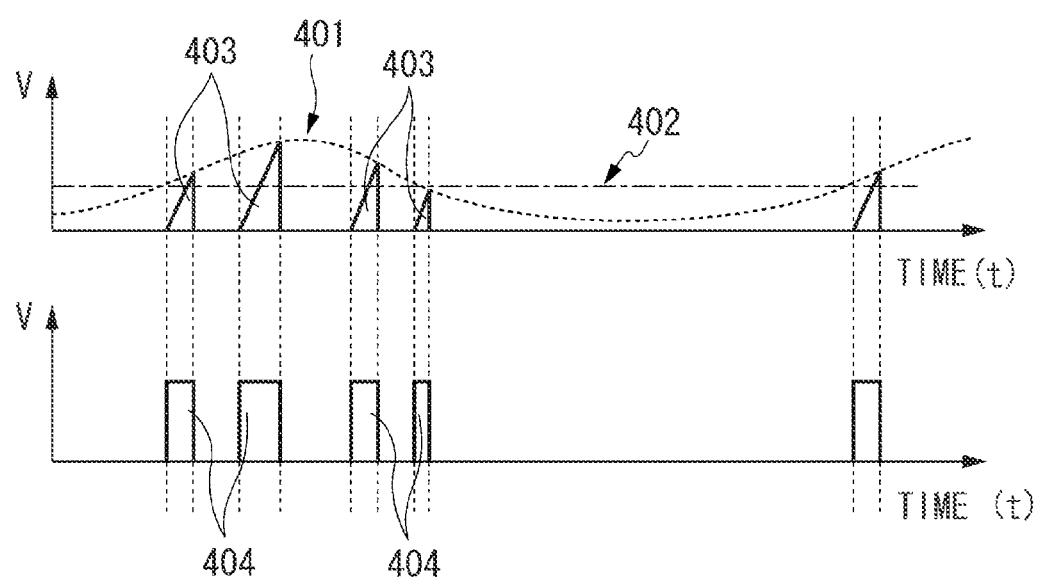
FIG. 2 illustrates an operation waveform during light load running according to a first exemplary embodiment.

FIG. 2 illustrates an example of an operation of the circuit illustrated in FIGS. 1A to 1C during light load running. The light load means a small-load state where the load circuit 120 is not operated.

FIG. 2 illustrates a feedback terminal voltage 401, an oscillation stop voltage 402, and a value 403 corresponding to an amount of a current flowing through the primary winding wire 105. The value 403 is the terminal voltage of the resistor 109.

The switching control IC 110 stops pulse outputting when the voltage of the terminal 4 drops. When a load is reduced to increase an output voltage, the shunt regulator 117 supplies more current, and hence an LED current of the photocoupler 111 increases while the voltage on the phototransistor side of the photocoupler 111 drops. As a result, the voltage of the feedback terminal 4 changes to be equal to or lower than a voltage 402 where the drive pulse stops (hereinafter, pulse stop voltage 402).

The switching control IC 110 then stops the pulse outputting from the terminal 7. A load current continues to flow, and hence a voltage stored in the electrolytic capacitor of the secondary side drops to reduce the current of the shunt regulator 117. As a result, the LED current of the photocoupler 111 is reduced to increase the current of the phototransistor.

When the voltage of the feedback terminal 4 rises to be equal to or more than the pulse stop voltage 402, pulse outputting is started again.

In this way, the operation of the switching element 108 during the light load running is controlled by the switching control IC 110. The operation in this case is also referred to as a burst operation.

During the burst operation, a period of an OFF-operation of a short cycle by the switching element 108 is determined by a voltage discharge period of the secondary side of the transformer, namely, an output voltage of the secondary side and inductance of the secondary side, and the circuit operates with a frequency much higher than the mechanical resonance frequency of the transformer.

The circuit and the circuit operation according to the present exemplary embodiment have been described.

Next, a feature of the first exemplary embodiment is described. The present exemplary embodiment has a feature that an OFF-period is forcibly set for the switching element 108, and an OFF-period of the switching element 108 during the burst operation is set associatively with a resonance cycle of the transformer.

Figure 4A:
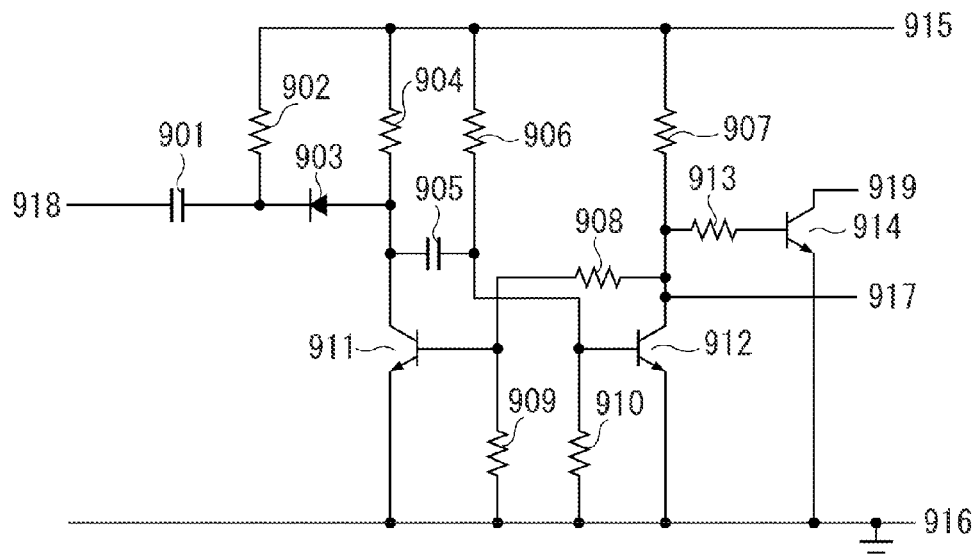
FIGS. 4A and 4B illustrate a circuit in which an OFF-period is forcibly set and an operation waveform according to the first exemplary embodiment.
Figure 4B:
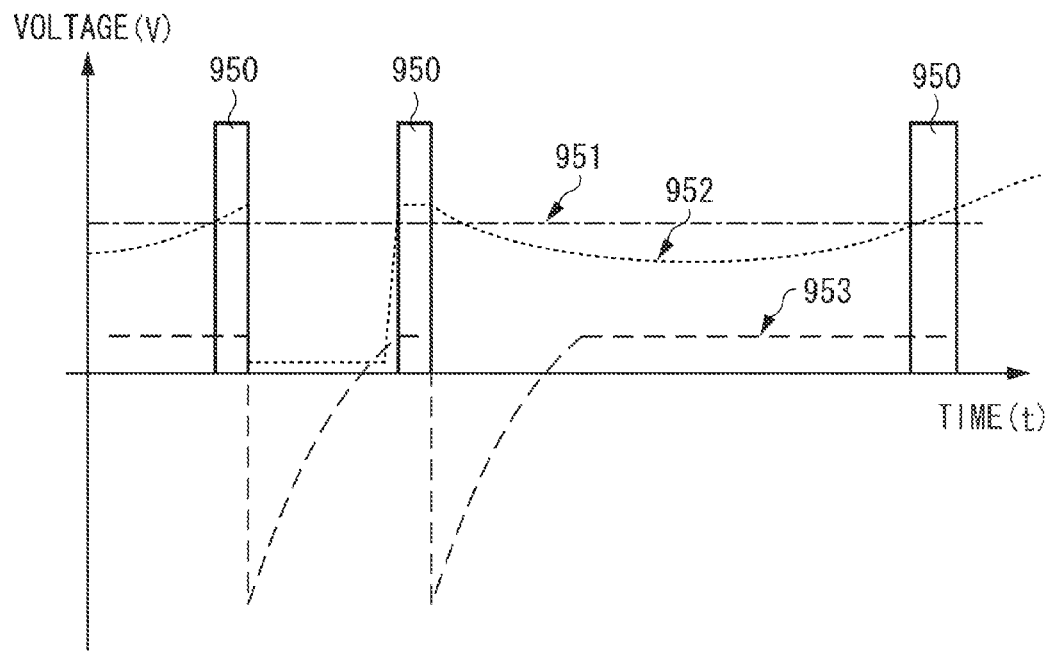

FIG. 1A illustrates a circuit 130 for forcibly setting an OFF-period. FIGS. 4A and 4B illustrate an example of a configuration of the circuit 130 for forcibly setting an OFF-period, which is the feature of the present exemplary embodiment.

The circuit 130 illustrated in FIG. 4A includes capacitors 901 and 905, a diode 903, resistors 902, 904, 906, 907, 908, 909, 910, and 913, and transistors 911, 912, and 914. The circuit 130 includes a one-shot multivibrator and an output transistor. The capacitor 901 is connected to the gate of the switching element 108. A collector of the transistor 914 is connected as an output terminal 919 to the terminal 4 of the switching control IC 110.

A control terminal 917 is low in output during a normal operation, outputs an ENABLE signal (Hi output) set to be of high impedance during light load running, and can be switched therebetween according to the state of the apparatus that uses the switching power source.

The circuit 130 can be configured to operate by automatically switching an output from the terminal 917 when a load current of the power source is detected to be low.

An input terminal 918 is connected to the terminal 7 of the switching control IC 110. During the normal operation, the collector of the transistor 912 is connected in a low state, the transistor 914 is in an open state, and the circuit 130 does not operate.

During the light load operation, when the collector of the transistor 912 is set to a high state and the ENABLE signal is set to high impedance, the circuit 130 operates based on a signal from a gate drive signal of the switching element 108. The circuit 130 also includes a power supply terminal 915.

FIG. 4B illustrates waveforms when the circuit 130 operates. The waveforms include a gate voltage waveform 950, a pulse stop voltage 951 generated based on the reference voltage 1107 in the switching control IC 110, a feedback terminal voltage 952, and a base terminal voltage 953 of the transistor 912. When the feedback terminal voltage 952 exceeds the pulse stop voltage 951, the switching control IC 110 outputs a pulse from the terminal 7, and maintains ON of the switching element 108 until a current detection terminal voltage of the terminal 6 reaches the feedback terminal voltage.

During this period, the diode 903 blocks a current, and hence the circuit 130 does not operate. The transistor 912 is accordingly ON, and an output of the transistor 914 is set to high impedance. When the gate terminal voltage drops to turn OFF the switching element 108, a current flows through the capacitor 901, the diode 903, and the capacitor 905, and a collector terminal voltage becomes, as in the case of the base terminal voltage 953, low at a rising edge where the switching element 108 is OFF. Then, the transistor 911 is turned ON.

A current starts to flow through the capacitor 905 via the resistor 906. For a period until a voltage of the capacitor 905 exceeds a voltage VBE between base emitters of the transistor 912, the transistor 912 is maintained OFF. During the OFF-period of the transistor 912, the transistor 914 is maintained ON. Thus, the terminal 4 of the switching control IC 110 is accordingly fixed at a low output, and oscillation of the switching element 108 by the switching control IC 110 is stopped.

When the voltage 905 rises with time, the transistor 912 is turned ON while the transistors 911 and 914 are turned OFF, and hence the terminal 4 of the switching control IC 110 is opened to enable oscillation. Thus, a period from first gate turning-ON to next gate turning-ON is determined by the time constant defined by the capacitor 905 and the resistor 906.

The number of switching times must be reduced as much as possible to improve switching efficiency. According to the present exemplary embodiment, to set the number of switching times two, a voltage to the feedback terminal 4 is determined based on a constant of the circuit 130 and a resistance value of the current detector resistor.

More specifically, an ON-period of one pulse application is adjusted to satisfy energy to be used, namely, a product of a load current and an output voltage, by two pulse applications (because output voltage becomes short in the case of one pulse).

In other words, the value of current detection resistance is determined to satisfy a relationship represented by the following expression (1), where v is an output voltage, I is an output current during light load running, Lp is primary inductance of the power source transformer, and Ip is a peak value of a current flowing at the primary inductance.

$$V \cdot I < Lp \cdot Ip2 < 2 \cdot V \cdot I \qquad (1)$$

Setting such a value of the current detection resistance enables adjustment to assure, while the voltage of the feedback terminal 4 does not drop equal to or less than the pulse stop voltage due to a shortage of power in a case of one wave (one application), dropping of the voltage of the feedback terminal 4 equal to or less than the pulse stop voltage in a case of two waves (two applications). In the adjustment based on the current detection resistance, an upper value of the current changes. Thus, to enable changing of the pulse stop voltage, other methods such as nonlinear setting of an operation of the current detection circuit can be used.

Because of such setting, when a load fluctuates, a time interval of a short pulse application of the two pulses (t2 of FIG. 6 to explain later) is determined based on the time constant of the resistor 906 and the capacitor 905 of the circuit illustrated in FIG. 4A, and a time interval of a long pulse application (T of FIG. 6 to explain later) changes according to load fluctuations to perform control. The time of the short pulse application of the two pulses, namely, the time constant of the resistor 906 and the capacitor 905, is set to ½ of a resonance cycle of the transformer, thereby cancelling a beat sound of the transformer.

In the first exemplary embodiment, control is performed to inhibit a switching operation of a specified time period by setting, with the voltage of the control terminal of the switching element 108 set as a signal source, the feedback terminal 4 of the switching control IC 110 to a low voltage and equal to or less than the switching stop voltage of the switching control IC 110. However, this configuration of the circuit is only an example, and other configurations can be employed as long as they provide similar effects.

Figure 3A:
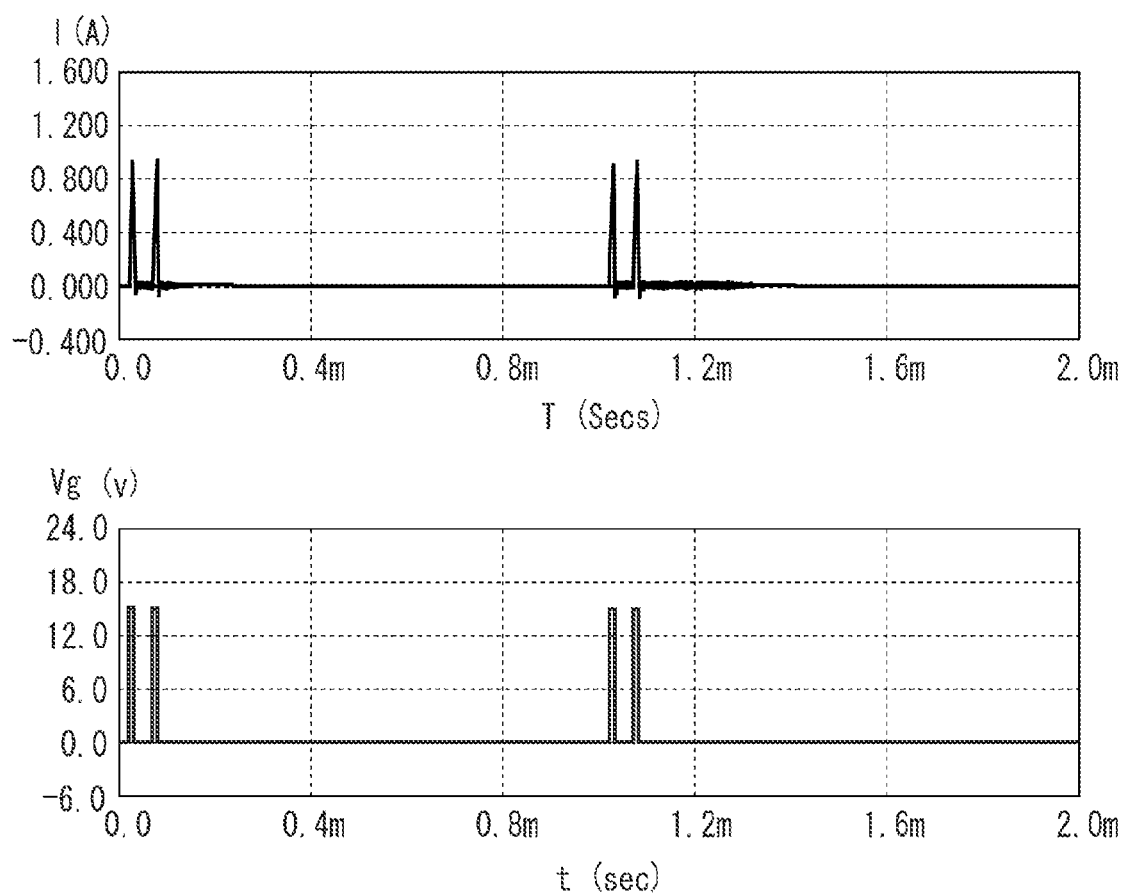
FIGS. 3A and 3B illustrate a drive current waveform of a transformer and a result of analyzing a frequency of the drive current waveform according to the first exemplary embodiment.
Figure 3B:
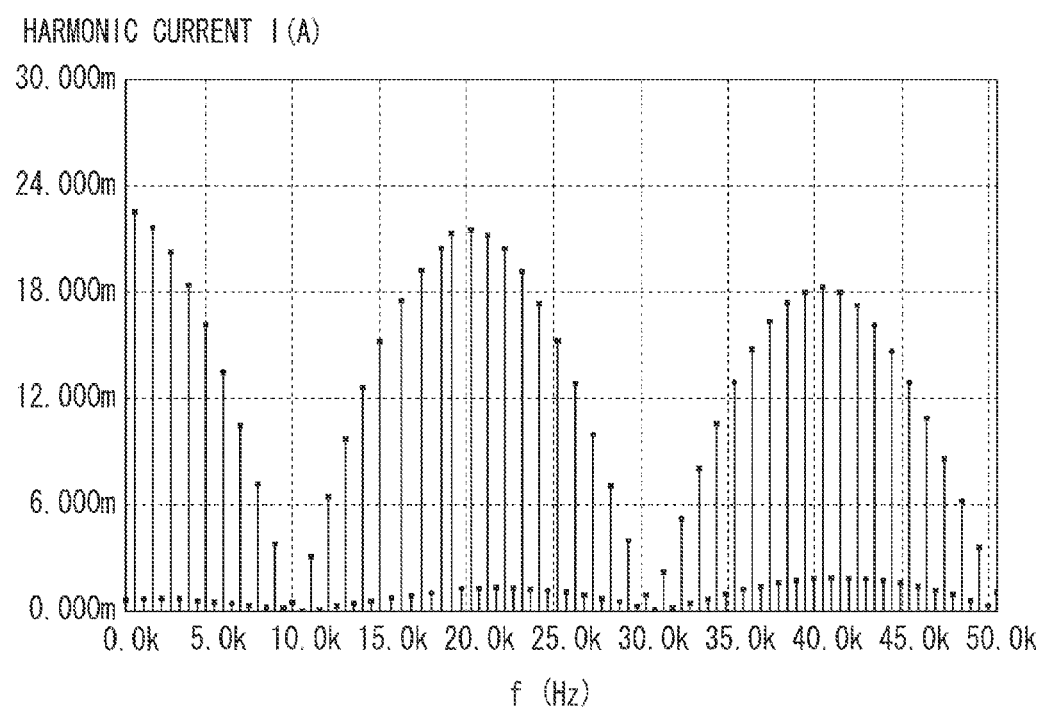

FIGS. 3A and 3B illustrate an operational feature of the present exemplary embodiment. FIG. 3A illustrates a drive current waveform of the transformer (upper figure) and a gate voltage waveform of the switching element for driving the transformer (lower figure). FIG. 3B illustrates a waveform when a frequency of the drive current waveform of the transformer is analyzed. In FIG. 3B, a horizontal axis indicates a frequency, and a vertical axis indicates a harmonic current value (MA). In the present exemplary embodiment, as described above, output energy is satisfied by pulses of two waves (two applications).

FIGS. 5A and 5B, FIGS. 6A and 6B, and FIGS. 7A and 7B (FIGS. 5A and 5B have been described above) illustrate how sound pressure of a sound changes based on a drive waveform when the switching power source is operated.

Figure 5A:
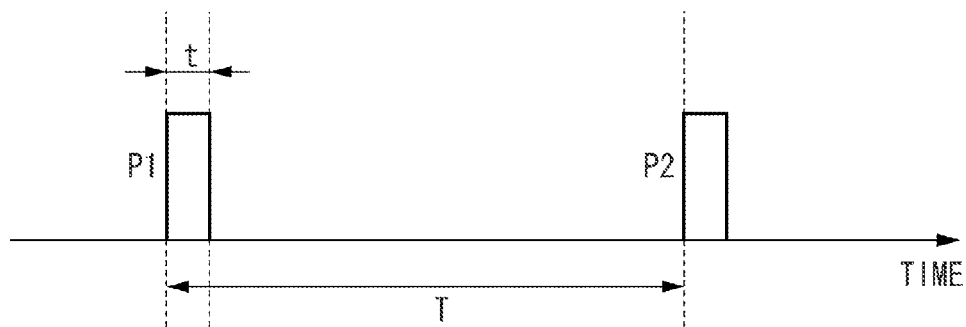
FIGS. 5A and 5B illustrate an input waveform to the transformer and a result of analyzing a frequency of the input waveform.
Figure 5B:
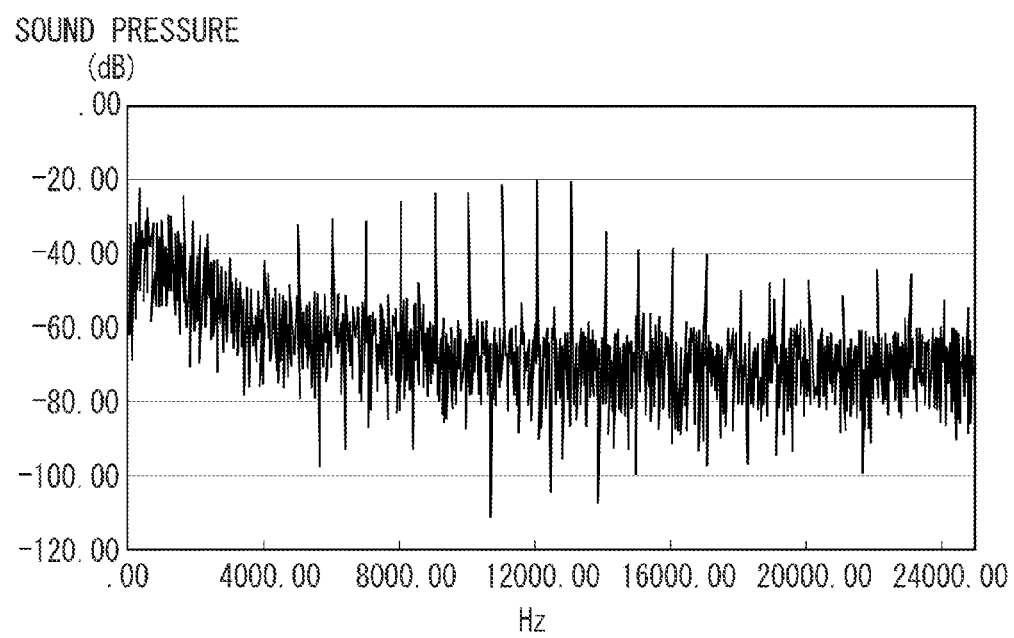
Figure 6A:
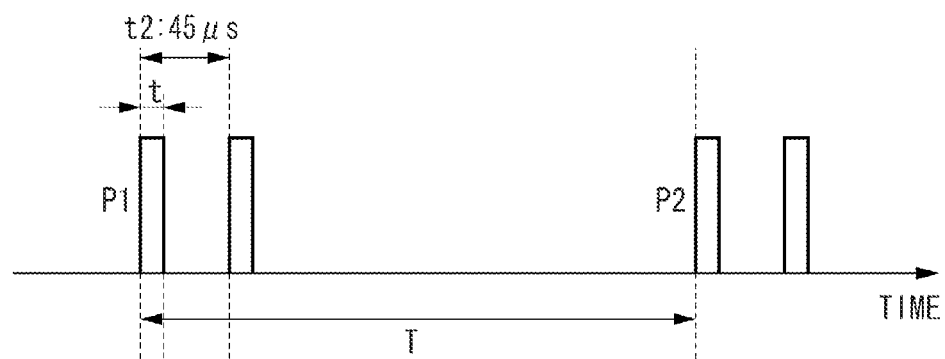
FIGS. 6A and 6B illustrate an input waveform to the transformer and a result of analyzing a frequency of the input waveform.
Figure 6B:
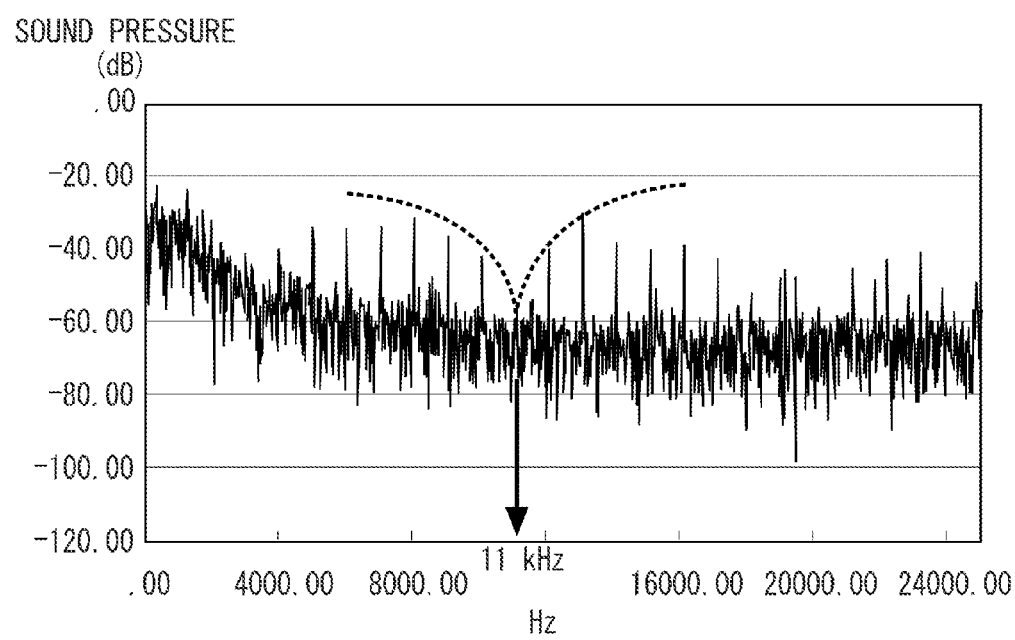
Figure 7A:
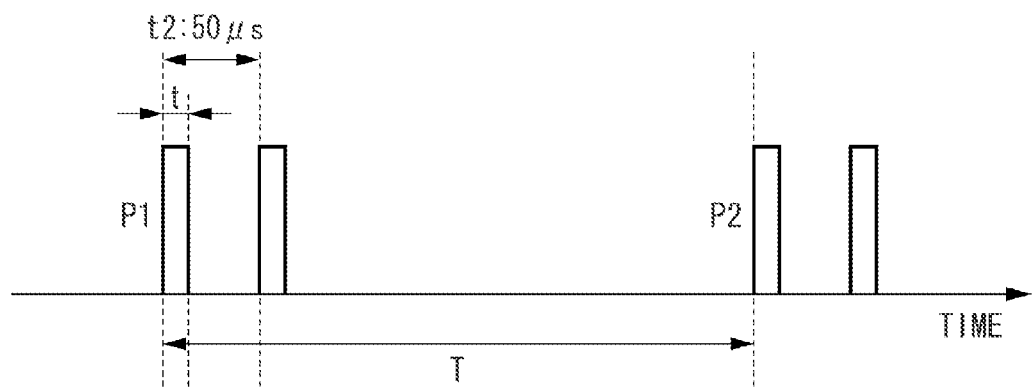
FIGS. 7A and 7B illustrate an input waveform to the transformer and a result of analyzing a frequency of the input waveform.
Figure 7B:
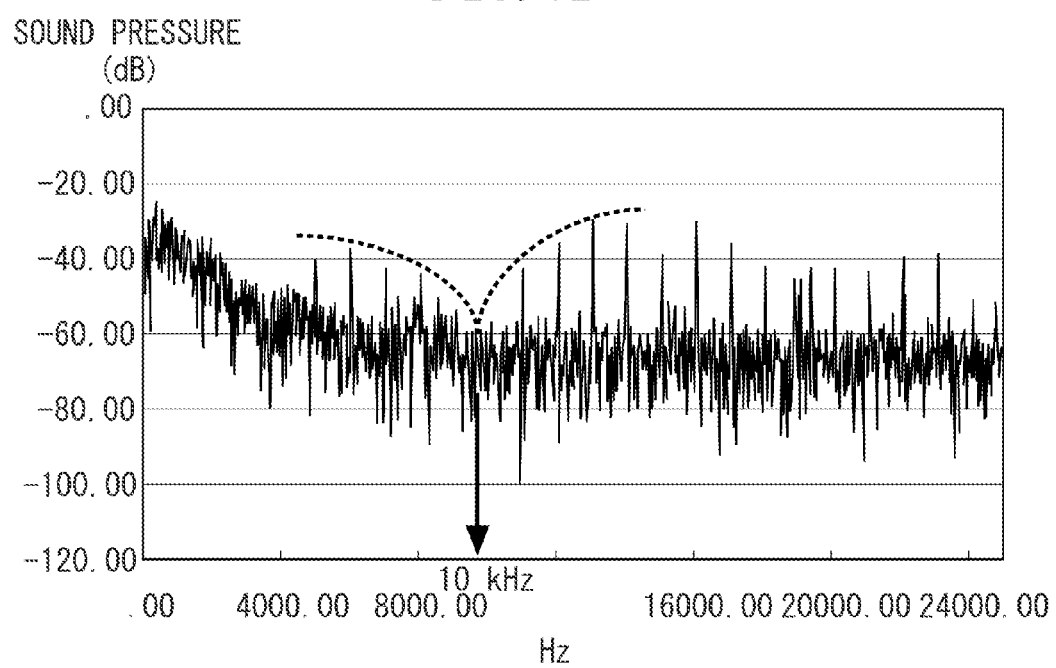

Each of FIGS. 5A, 6A, and 7A illustrates a waveform of a drive signal input to the transformer. Each of FIGS. 5B, 6B, and 7B illustrates a waveform acquired by measuring sound pressure through the microphone and analyzing a frequency of the measured result. In each of FIGS. 5B, 6B, and 7B, a horizontal axis indicates a frequency, and a vertical axis indicates sound pressure (decibel). In the case of a waveform example for driving per wave at 1 kilohertz (corresponding to cycle T in FIG. 5(*a*)) and a drive waveform that becomes 1 kilohertz by combining a long cycle and a short cycle, the transformer is driven so that energies input per unit time to the transformer can be equal.

In other words, driving is performed under a condition that load voltages and currents of the secondary side of the power source becomes equal. ON-periods of the switching element 108 illustrated in FIGS. 6A and 6B and FIGS. 7A and 7B are equal with each other (to facilitate comparison).

FIG. 5B illustrates frequency characteristics of sound pressure of a sound from the transformer when the transformer is driven at 1 kilohertz per wave (corresponding to cycle T in FIG. 5(*a*)). From FIG. 5B, it can be understood that the sound pressure of the sound from the transformer is a combination of resonance frequency characteristics and the drive waveform of the transformer.

In other words, as the frequency analysis result of the drive waveform shows, the sound pressure of the sound from the transformer becomes a harmonic. An envelope of the frequency characteristics of the sound pressure of the sound from the transformer is similar to that of the resonance frequency characteristics of the transformer.

FIGS. 6A and 6B illustrate an example where, in order to cancel a sound near 11 kilohertz among sounds from the transformer, a cycle t2 from a first pulse to a second pulse is set to 45 microseconds. As illustrated in FIG. 6B, the sound pressure of the sound from the transformer is attenuated around 11 kilohertz, and almost no sound pressure of the sound is observed near 11 kilohertz (also referred to as a dark noise level).

FIGS. 7A and 7B similarly illustrate an example where a sound is canceled around 10 kilohertz by adjusting a pulse interval of the short cycle side. In FIGS. 7A and B, a cycle t from a first pulse to a second pulse is set to 50 microseconds. As illustrated in FIG. 7B, the sound pressure of the sound from the transformer is attenuated around 10 kilohertz, and almost no sound pressure of the sound is observed near 10 kilohertz.

Thus, changing the pulse interval of the short cycle side (t2) with the cycle of the long cycle side being set to 1 millisecond (frequency of 1 kilohertz) enables reduction of sound pressure of a frequency band corresponding to the pulse interval of the short cycle side without changing frequencies of the basic wave and the harmonic.

As described above, by performing the switching operation at the interval of ½ of the mechanical resonance cycle of the transformer to supply a current to the transformer, in other word the pulse interval of short cycle (t2) being set the interval of ½ of the mechanical resonance cycle of the transformer, mechanical resonance (beat sound) of the transformer can be reduced.

The mechanical resonance cycle of the transformer is mostly determined based on a core material, a core shape (e.g., sectional shape), and a size. However, there is a slight variation. In the drive circuit, a variation occurs due to components or a temperature during the operation. Ideally, therefore, the transformer is controlled to be driven at the cycle of ½ of the mechanical resonance cycle of the transformer. In actual driving, however, slight deviation may occur from the cycle of ½ of the resonance cycle.

However, as can be understood from FIG. 3B, there is a range of frequencies of the drive cycle that provides a mechanical resonance attenuation effect of the transformer (range of frequencies that provides effects).

For example, in frequency characteristics for 10 kilohertz illustrated in FIG. 7B, the beat sound is reduced (attenuated) not only at 10 kilohertz but also at a frequency of a range near 10 kilohertz. In frequency characteristics for 11 kilohertz illustrated in FIG. 6B, the beat sound is also reduced (attenuated) at a frequency of a range near 11 kilohertz.

Figure 13:
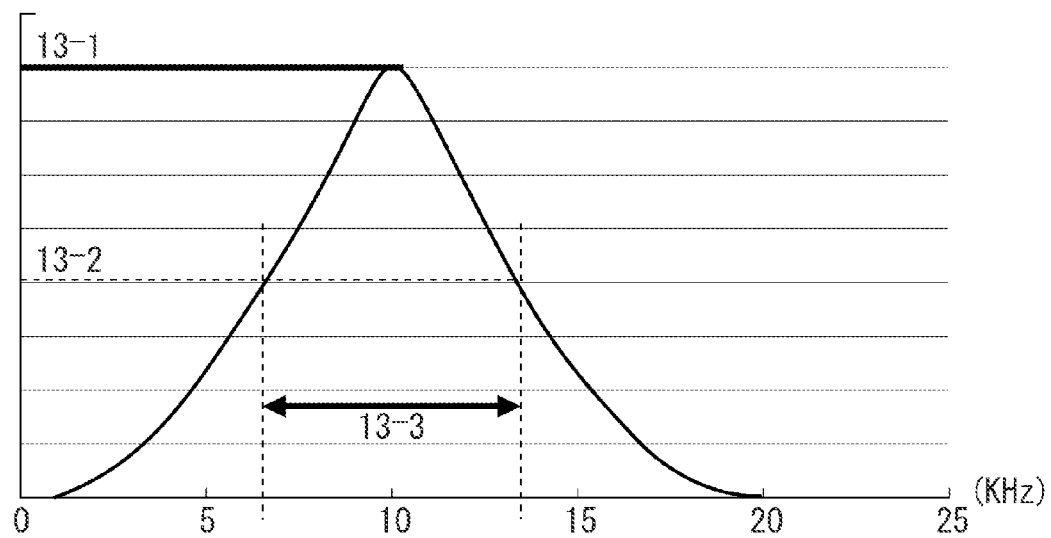
FIG. 13 illustrates a frequency band that provides a beat sound reducing effect.

FIG. 13 illustrates a range of frequencies of the drive cycle that provides an attenuation effect. FIG. 13 illustrates which frequency component is reduced and how much at a frequency of the drive cycle illustrated in FIG. 3B based on the analysis result illustrated in FIG. 3B. In FIG. 13, a horizontal axis indicates a frequency, and a vertical axis indicates an attenuation amount of a sound.

FIG. 13 illustrates a maximum value 13-1 of the attenuation amount, and a value 13-2 that is ½ of the maximum value of the attenuation amount. In this case, the attenuation amount is maximum at 10 kilohertz. FIG. 13 also illustrates a frequency range (also referred to as a frequency band) 13-3 where the attenuation amount is ½ of the maximum value (Full Width at Half Maximum (FWHM)). In FIG. 13, the range of 7 kilohertz to 13 kilohertz is a frequency range where the attenuation amount is ½ or less).

Thus, based on frequency characteristics of the drive cycle, as illustrated in FIG. 13, a beat sound is reduced in the frequency band where an attenuation effect of the harmonic by the drive cycle is ½ or less (Full Width at Half Maximum (FWHM)).

As a frequency band where the attenuation effect is ½, a drive cycle is set so that a frequency band where an audible frequency band most effective in human audibility is a predetermined range, can be set.

The present invention has been described by taking the example where the two pulses (two waves) are repeated during one burst operation. However, it is not limited to the two waves, and the present invention can be realized by three waves or four waves. By increasing the number of waves to three and four to change the pulse interval, the sound pressure can be reduced over a wider range of frequencies than that in the case of the two waves. In the case of the three waves or four waves, the cycle t2 is set the interval of ½ of the mechanical resonance cycle of the transformer.

The present exemplary embodiment is described by taking the example of the configuration where the circuit is added to the primary side of the transformer. However, a similar circuit can be added to the secondary side. As an example, FIG. 1C illustrates the configuration where the circuit 130 for setting an OFF-period is included on the secondary side of the transformer.

Next, a second exemplary embodiment is described. The present exemplary embodiment is different from the first exemplary embodiment in that a timer circuit is included in the switching control IC 110 of the first exemplary embodiment.

Figure 8:
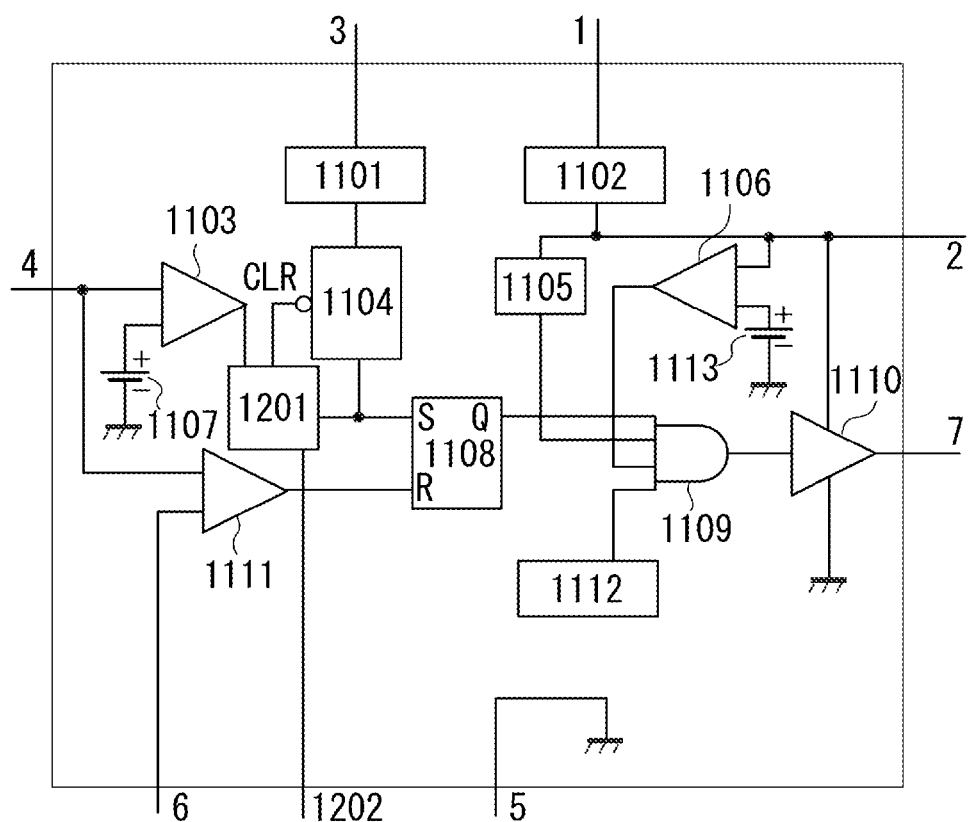
FIG. 8 illustrates a circuit in which an OFF-period is forcibly set according to a second exemplary embodiment.

FIG. 8 is a block diagram illustrating an internal circuit of a switching control IC 110 according to the present exemplary embodiment. The circuit includes a timer circuit 1201 with a control terminal, and a control terminal 1202. A terminal 1 is an activation terminal connected to a primary side capacitor 102 via a resistor 103. When the circuit of the present exemplary embodiment is a power source circuit, the resistor 103 can be omitted.

When power is turned ON to activate a power source, in the case of a low voltage supplied from a terminal 2 (Vcc terminal), an activation circuit 1102 operates to supply power to the switching control IC 110. When the Vcc terminal voltage of the terminal 2 becomes a sufficient voltage, the activation circuit 1102 separates the terminal 1 from the switching control IC 110 to prevent useless power consumption.

The terminal 2 acquires power by power supplied from an auxiliary winding wire of a transformer. A comparator 106, which protects the circuit when a power source voltage drops, compares a voltage input from the terminal 2 with a reference voltage generated inside to monitor a power source voltage of the terminal 2.

A reference power generation circuit 1105 supplies a reference voltage necessary for the operation in the switching control IC 110. When a correct reference voltage is not generated, a NOR circuit 1109 is notified of this to stop an output.

A terminal 3, to which an output from a detection circuit detecting a voltage drop is input, monitors a flyback voltage to detect timing when voltage amplitude is lowest. To prevent an erroneous operation, a timing generation signal is transmitted through a one-shot circuit 1104 to an output to a flip-flop 1108.

An output of the flip-flop 1108 is connected to the NOR circuit 1109. Based on the output, a driver circuit 1110 operates to turn ON/OFF a switching element 108 serving as a main FET for driving a primary winding wire of the transformer connected to a terminal 7.

A terminal 4 is a feedback (FB) terminal for performing feedback inputting, a terminal 5 is a GND terminal, and a terminal 6 is a current detection terminal. The switching control IC 110 compares an input voltage of the feedback terminal 4 with an input voltage of the current detection circuit 6, and resets the output flip-flop 1108 when the input voltage of the current detection terminal 6 is larger. As a result, the driver circuit 110 outputs Lo to turn OFF the switching element 108.

Next, an operation during light load running according to the present exemplary embodiment is described. The terminal 4 is connected to a comparator 1103, and is compared with a voltage source 1107 by the comparator 1103. An output of the comparator 1103 is connected to a CLR terminal of the one-shot circuit 1104. When a voltage of the FB terminal 4 drops, the output is turned OFF, and a driver output becomes low. Thus, when the voltage to the FB terminal 4 drops during the light load running, the switching control IC 110 stops the switching operation.

Then, when the voltage to the FB terminal 4 reaches the pulse stop voltage or more, the switching control IC 110 resumes the switching operation. As a result, even when output voltage ripples increase, overshooting or undershooting occurs at the FB terminal 4, and a burst cycle that is a continuously long cycle is set.

A difference of the present exemplary embodiment from the switching control IC 110 of the first exemplary embodiment is addition of the timer circuit 1201 with a control terminal. The timer circuit 1201 starts its operation based on an output from the comparator 1103, and is connected to the CLR terminal of the one-shot circuit 1104. The operation of the timer circuit 1201 can be controlled by the terminal 1202 located outside the switching control IC 110.

An internal circuit of the timer circuit 1201 includes a one-shot circuit and a timer in combination. The internal circuit performs nothing at a first operation, but transmits the output of the comparator 1103 to the one-shot circuit 1104. Based on a next output of the comparator 1103, the internal circuit stops the output for a period determined by the timer circuit 1201, and then transmits the output of the comparator 1103 to the one-shot circuit 1104.

The operation period of the timer circuit 1201 is determined based on, for example, the voltage of the terminal 1202. For example, a resistor is connected to the GND terminal 5, and a current is supplied to the terminal 1202 from the power source. The voltage of the terminal 1202 can accordingly be changed by the resistor located outside the terminal 1202. The timer circuit 1201 determines an operation period of the timer based on the voltage of the terminal 1202. Thus, based on the value of the resistor connected between the terminal 1202 and the GND terminal 5, the burst period of the short cycle side can be changed.

The present exemplary embodiment has been described by taking the example where the operation period of the timer circuit 1201 is changed based on the voltage of the terminal 1202. However, control can be performed by other methods.

According to the present exemplary embodiment, as in the case of the first exemplary embodiment, the beat sound of the transformer can be reduced by the simple circuit.

The first and second exemplary embodiments have been described by taking the switching power source based on the pseudo-resonance system as an example of a switching power source. However, it is not limited to the pseudo-resonance system, and can be applied to switching power sources of other systems.

Next, a third exemplary embodiment is described. The present exemplary embodiment is different from the first and second exemplary embodiments in that control during light load running is performed in a switching power source having an OFF-mode for not directly outputting a voltage acquired after rectifying a voltage of a secondary winding wire of a transformer.

In the case of the switching power source having the OFF-mode, during the burst operation in the light load running, the OFF-period is determined based on the period of discharging (hereinafter, discharge period) energy of the transformer to a secondary side. The discharge period is changed by reducing the output voltage. Thus, by performing control to reduce the output voltage, the pulse interval during the burst operation can be controlled.

Particularly, in the case of the switching power source of the pseudo-resonance system and a switching power source of a ringing choke converter (RCC) system, the OFF-period is determined based on the discharge period of the energy of the transformer to the secondary side.

The discharge period is determined based on the secondary side inductance and the secondary side output voltage when the energy of the transformer is constant. Reducing the output voltage can accordingly prolong the discharge period. When the discharge period is set to ½ of the resonance cycle of the transformer, as in the case of the first and second exemplary embodiments, the beat sound from the transformer can be reduced.

Figure 9A:
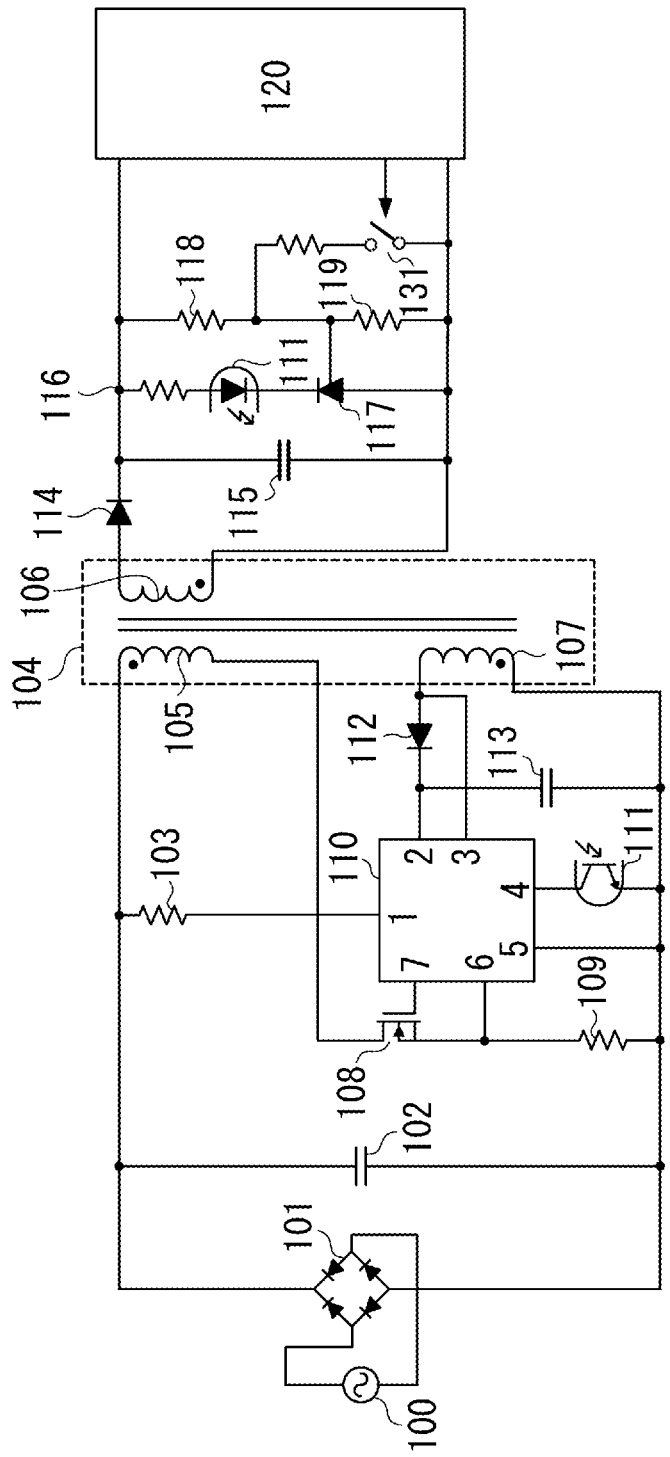
FIGS. 9A to 9C illustrate a circuit of a switching power source based on a pseudo-resonance system and operation waveforms according to a third exemplary embodiment.
Figure 9B:
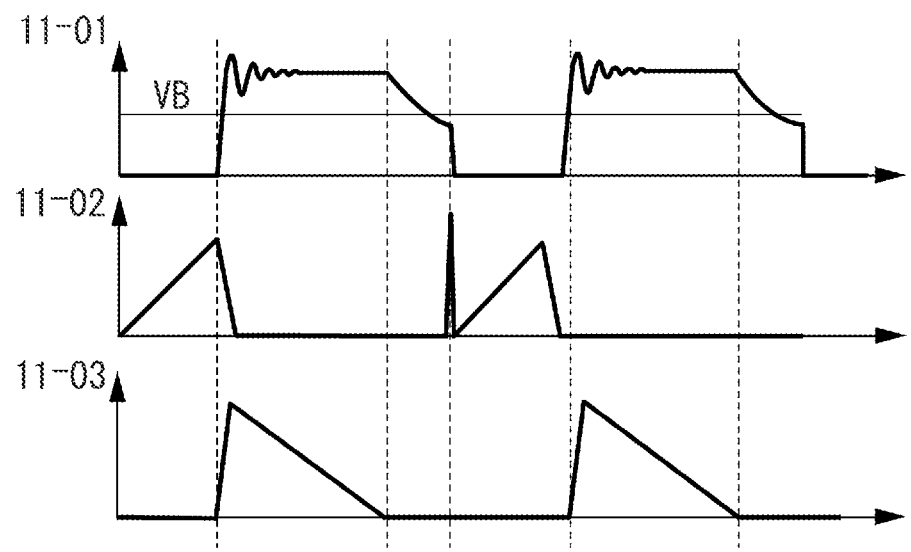

FIG. 9A illustrates an example of a circuit according to the present exemplary embodiment. A switch 131 is turned ON during normal running, and turned OFF during light load running. Turning OFF the switch 131 enables lowering of a target value of the output voltage. FIG. 9B illustrates a waveform in a state before the target value is lowered, and FIG. 9C illustrates a waveform after the target value is lowered.

Figure 9C:
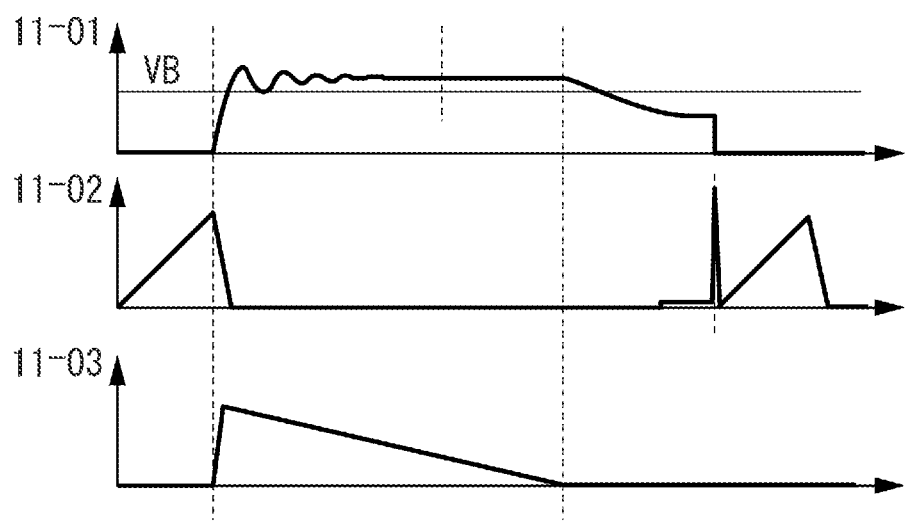
Figure 10:
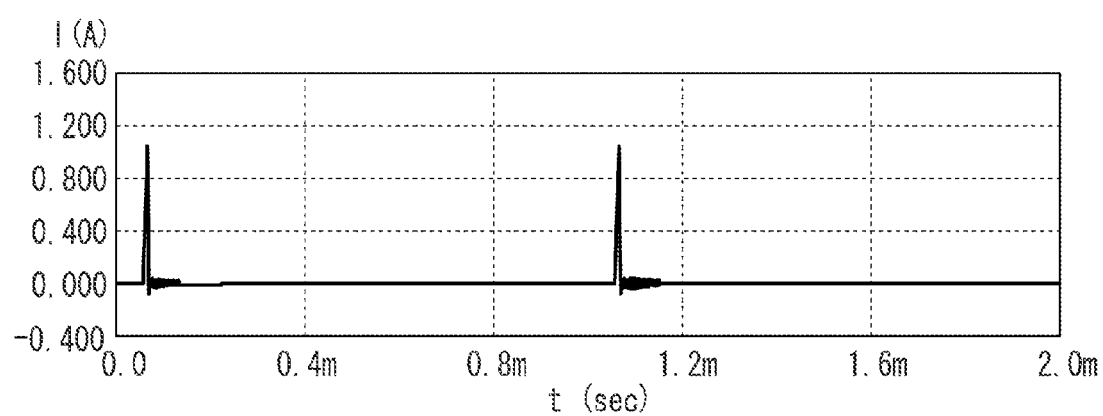
FIG. 10 illustrates a drive current waveform of a conventional transformer.
Figure 11:
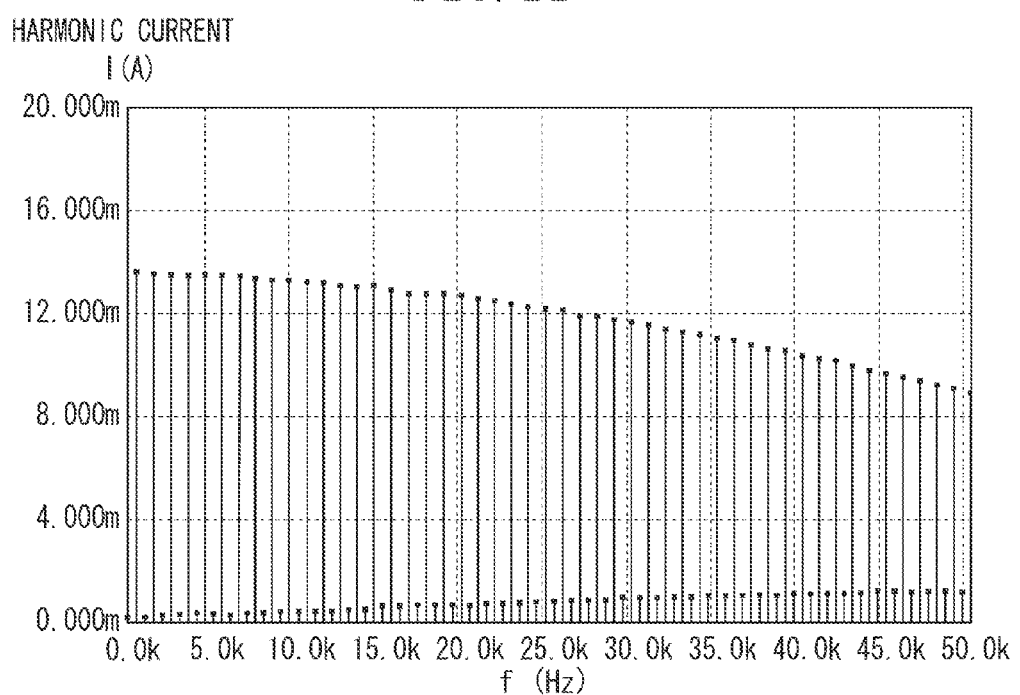
FIG. 11 illustrates frequency characteristics of a conventional drive current waveform.

FIGS. 9B and 9C illustrate a drain-source voltage waveform 11-01 of an FET 108, a drain current waveform 11-02, and a current waveform 11-03 where a forward direction of a secondary diode is a positive direction, namely, a current of a secondary winding wire of the transformer. Under a load during the normal running, the output voltage is high, and hence the gradient of attenuation of the current of the secondary winding wire is large.

On the other hand, during the light load running, the output voltage is low, and hence attenuation of the current of the secondary winding wire is gradual, prolonging a pulse interval. To prevent application of any intermediate voltage during the light load running, a configuration where no voltage is output by a load switch can be employed.

(Application Example of Switching Power Source)

For example, the switching power source can be applied as a low-voltage power source in an image forming apparatus such as a printer, a copying machine, or a facsimile machine. The switching power source can also be applied as a power source for supplying power to a controller that is a control unit in the image forming apparatus or to a motor that is a drive unit of a conveyance roller for conveying sheets.

Figure 14A:
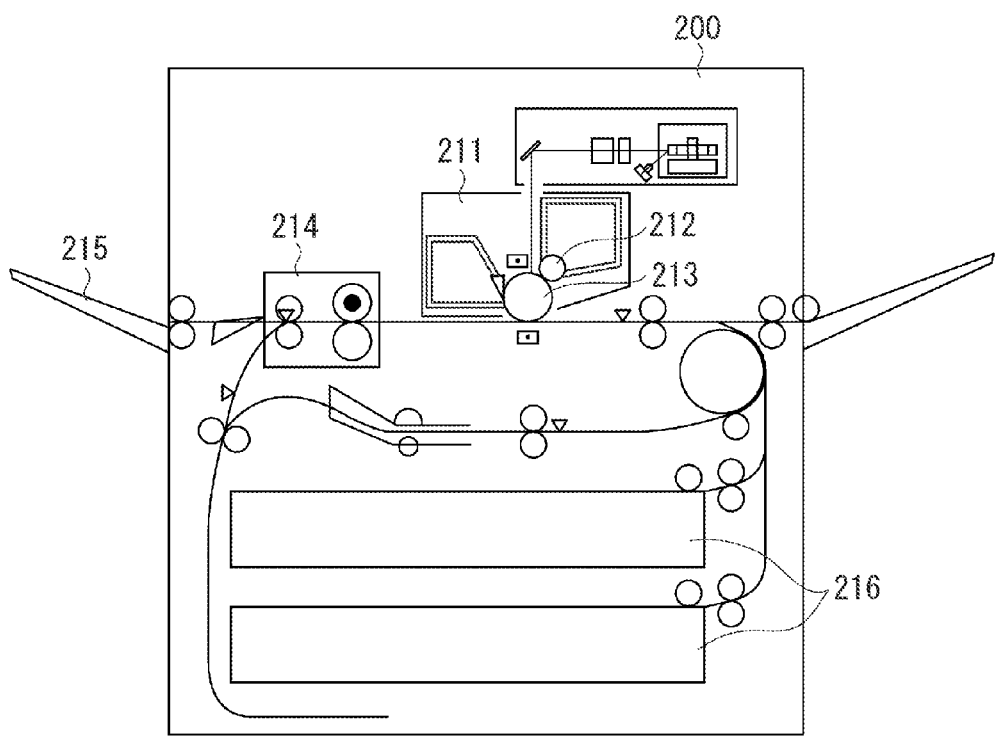
FIGS. 14A and 14B illustrate application examples of a switching power source.

FIG. 14A illustrates a schematic configuration of a laser beam printer that is an example of the image forming apparatus. A laser beam printer 200 includes a photosensitive drum 213 (image carrier) to form a latent image, and a development unit 212 for developing the latent image formed on the photosensitive drum 213 by toner as an image forming unit 211. The toner image developed on the photosensitive drum 213 is transferred to a sheet (not illustrated) that is a recording medium supplied from a cassette 216, and the toner image transferred to the sheet is fixed by a fixing device 214 to be discharged to a tray 215.

Figure 14B:
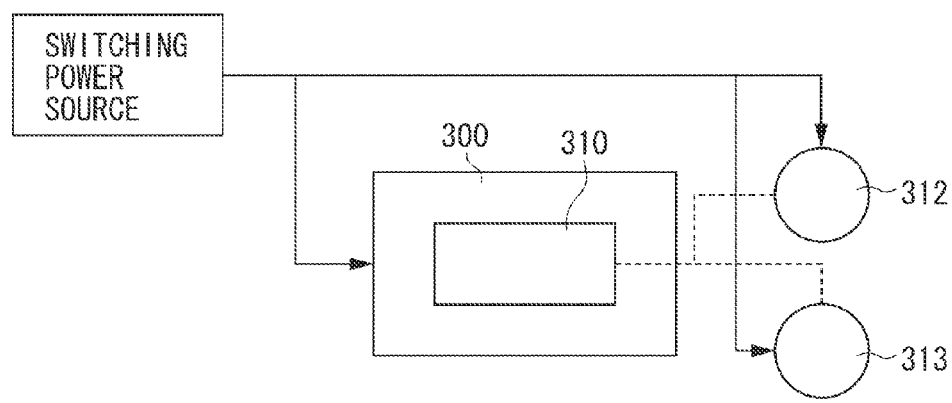

FIG. 14B illustrates a power supply line from the power source to the controller as the control unit and the motor as the drive unit in the image forming apparatus. The abovementioned switching power source can be applied as a low-voltage power source for supplying power to a controller 300 that includes a central processing unit (CPU) 310 for controlling an image forming operation of the image forming apparatus and to motors 312 and 313 that are drive units for forming images.

As an example of power to be supplied, a voltage of 3.3 volts is supplied to the controller 300, and a voltage of 24 volts is supplied to the motor. For example, the motor 312 drives the conveyance roller for conveying sheets, and the motor 313 drives the fixing device 214.

When the image forming apparatus changes to an energy-saving mode when it is not in operated, the switching power source changes to the light load state by reducing the voltage to be output, and the beat sound is reduced by changing to the abovementioned switching operation, thereby enabling the image forming apparatus to be quietly operating. The control of the switching operation according to the exemplary embodiments can be applied, not limited to the image forming apparatus, as a low-voltage power source to other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-141938 filed Jun. 22, 2010, which is hereby incorporated by reference herein in its entirety.

What is claimed is:

1. A switching power source comprising:
   a transformer;
   a switching unit configured to switch a voltage supplied to a primary side of the transformer;
   an output unit configured to output a voltage generated on a secondary side of the transformer; and
   an OFF-period setting unit configured to set an OFF-period during which the switching unit is turned on twice according to a resonance cycle of the transformer, in a case where a state is shifted from a state that the switching unit is continuously driven to a state that an operation to turn on the switching unit at least twice is repeated in a predetermined cycle.

2. The switching power source according to claim 1, wherein the OFF-period setting means is configured to set the OFF-period of the switching means in accordance with a resonance cycle when the transformer is driven.

3. The switching power source according to claim 1, wherein the OFF-period setting unit sets the OFF-period of the switching unit to be ½ of a resonance cycle of the transformer when the transformer is driven.

4. The switching power source according to claim 1, wherein the OFF-period setting means sets the OFF-period of the switching means by lowering said voltage generated on a secondary side of the transformer.

5. The switching power source according to claim 1, wherein a drive pulse generated by driving the switching unit includes at least pulses of two waves, and the OFF-period that is an interval between the pulses of the two waves is switched.

6. The switching power source according to claim 1, wherein the OFF-period setting unit forcibly sets the OFF-period of the switching unit.

7. The switching power source according to claim 1, wherein the switching power source reduces a power source voltage during the light load running.

8. An image forming apparatus comprising:
   an image forming unit configured to form an image;
   a control unit configured to control an operation of the image forming unit; and
   a switching power source configured to supply power to the control unit,
   wherein the switching power source includes;
   a transformer;
   a switching unit configured to switch a voltage supplied to a primary side of the transformer;
   an output unit configured to output a voltage generated on a secondary side of the transformer; and
   an OFF-period setting unit configured to set an OFF-period during which the switching unit is turned on twice according to a resonance cycle of the transformer, in a case where a state is shifted from a state that the switching unit is continuously driven to a state that an operation to turn on the switching unit at least twice is repeated in a predetermined cycle.

9. The image forming apparatus according to claim 8, wherein the OFF-period setting means is configured to set the OFF-period of the switching means in accordance with a resonance cycle when the transformer is driven.

10. The image forming apparatus according to claim 8, wherein the OFF-period setting unit sets the OFF-period of the switching unit to be ½ of a resonance cycle of the transformer when the transformer is driven.

11. The image forming apparatus according to claim 8, wherein the OFF-period setting means sets the OFF-period of the switching means by lowering said voltage generated on a secondary side of the transformer.

12. The image forming apparatus according to claim 8, wherein a drive pulse generated by driving the switching unit includes at least pulses of two waves, and the OFF-period that is an interval between the pulses of the two waves is switched.

13. The image forming apparatus according to claim 8, wherein the OFF-period setting unit forcibly sets the OFF-period of the switching unit.

14. The image forming apparatus according to claim 8, wherein the switching power source reduces a power source voltage during the light load running.

15. The image forming apparatus according to claim 8, wherein the voltage output from the output unit of the switching power source is supplied to a drive unit configured to drive the image forming unit.

16. The image forming apparatus according to claim 8, wherein in an energy-saving state where the image forming unit does not perform image forming, the control unit outputs to the switching power source a signal to switch the switching power source to the light load state.

\* \* \* \* \*